United States Patent
Simchoni et al.

(10) Patent No.: US 6,516,559 B1
(45) Date of Patent: Feb. 11, 2003

(54) INSECT TRAP

(75) Inventors: Miriam Simchoni, Marom Hagalil (IL); Meir Shinitzky, Kfar Shmaryshu (IL)

(73) Assignee: A-Trap, Ltd., Katzrin (IL)

( * ) Notice: Subject to any disclaimer, the term of this patent is extended or adjusted under 35 U.S.C. 154(b) by 0 days.

(21) Appl. No.: 09/555,386

(22) PCT Filed: Nov. 26, 1998

(86) PCT No.: PCT/IL98/00579

§ 371 (c)(1), (2), (4) Date: Aug. 21, 2000

(87) PCT Pub. No.: WO99/26471

PCT Pub. Date: Jun. 3, 1999

(30) Foreign Application Priority Data

Nov. 26, 1997 (IL) .................. 122306

(51) Int. Cl.[7] .............. A01M 1/02; A01M 1/14
(52) U.S. Cl. .......................... 43/114; 43/107
(58) Field of Search .............. 43/107, 114, 132.1

(56) References Cited

U.S. PATENT DOCUMENTS

| | | | | |
|---|---|---|---|---|
| 4,168,591 A | * | 9/1979 | Shaw | 43/114 |
| 4,506,473 A | * | 3/1985 | Waters, Jr. | 43/107 |
| 4,608,774 A | * | 9/1986 | Sherman | 43/114 |
| 4,849,216 A | * | 7/1989 | Andersen | 424/84 |
| 4,907,366 A | * | 3/1990 | Balfour | 43/132.1 |
| 5,123,201 A | * | 6/1992 | Reiter | 43/107 |
| 5,241,778 A | * | 9/1993 | Price | 43/132.1 |
| 5,382,422 A | | 1/1995 | Dieguez et al. | 43/111 |
| 5,657,576 A | * | 8/1997 | Nicosia | 43/132.1 |
| 5,669,176 A | | 9/1997 | Miller | 43/139 |
| 5,737,870 A | * | 4/1998 | Thind | 43/107 |
| 5,799,436 A | * | 9/1998 | Nolen et al. | 43/112 |
| 5,943,815 A | * | 8/1999 | Paganessi et al. | 43/107 |
| 6,050,025 A | * | 4/2000 | Wilbanks | 43/112 |
| 6,055,766 A | * | 5/2000 | Nolen et al. | 43/112 |
| 6,088,949 A | * | 7/2000 | Nicosia et al. | 43/107 |
| 6,145,243 A | * | 11/2000 | Wigton et al. | 43/107 |
| 6,209,256 B1 | * | 4/2001 | Brittin et al. | 43/107 |
| 6,305,122 B1 | * | 10/2001 | Iwao et al. | 43/112 |
| 6,425,202 B1 | * | 7/2002 | Lin et al. | 43/107 |

FOREIGN PATENT DOCUMENTS

| | | | |
|---|---|---|---|
| AU | 8928561 B1 | * | 7/1989 |
| FR | 2 705 200 | | 5/1993 |
| FR | 2705200 B1 | * | 11/1994 |
| JP | 6-46 B1 | * | 1/1994 |
| JP | 7-203821 B1 | * | 8/1995 |
| JP | 10-229801 B1 | * | 9/1998 |
| JP | 11-346628 B1 | * | 12/1999 |
| JP | 11-396629 B1 | * | 12/1999 |
| JP | 2000-139318 B1 | * | 5/2000 |
| JP | 2000-189030 B1 | * | 7/2000 |
| WO | WO-92/17060 B1 | * | 10/1992 |

* cited by examiner

Primary Examiner—Darren W. Ark
(74) Attorney, Agent, or Firm—Fay, Sharpe, Fagan, Minnich & McKee, LLP

(57) ABSTRACT

A method and a device (10) for trapping insects which feed on mammalian blood, such as mosquitoes, utilize in combination a chemical attractant (24) and a physical attractant consisting of a dark panel (22), heated to e.g., 30 to 45 degrees Celsius. The chemical attractant may include carbon dioxide, generated for example by action of microorganisms on a fermentable substrate in aqueous medium, or it may be selected from fermenting yeast, yeast extract, peptone, acetone, lactic acid and carbon dioxide. The insects may be killed by adhesive applied onto the panel (22).

10 Claims, 3 Drawing Sheets

INSECT TRAP

FIELD OF THE INVENTION

The present invention is in the field of insect trapping. More specifically, the invention relates to a device and method for trapping insects which feed on mammalian blood.

BACKGROUND OF THE INVENTION AND PRIOR ART

Insects use their senses to search for food. A combination of chemical and physical factors whether by virtue of either their sheer existence or by their presence at a definite magnitude range are intercepted by the insect sensory organs to direct it towards the potential food source. Such factors that cause the insect to approach such a site will henceforth be referred to as attractants. A prominent attractant cited repeatedly in the literature is carbon dioxide (e.g. Edman, Orientation of some Florida mosquitoes towards small vertebrates and carbon dioxide in the field. *Journal of Medical Entomology,* 15:292–296, 1979). An organic molecule, 1-octen-3-ol is also potentially attractive to insects and mosquitoes, alone or in combination with other factors (e.g. Hall et al., 1-octen-3-ol: a potent olfactory stimulant and attractant for tsetse isolated from cattle odors, *Insect Science and its Applications,* 5:535–539, 1984).

Female mosquitoes need to consume a certain amount of mammalian blood in order to complete the breeding cycle and are therefore equipped with necessary facilities for accomplishing this task. In this context, female mosquitoes are provided with a potency to detect mammals, including humans. Mosquito bites are a source of great inconvenience and are also a disease transmission pathway and there is accordingly a constant search for effective ways to eliminate mosquitoes. Up to now there has not been found an efficient practical method of effectively eliminating this pest. One method of eliminating mosquitoes proposed in the past is by luring them into traps.

Several factors were shown previously to serve as attractants of insects in various kinds of traps. Such are, for example, carbon dioxide, octenol and animal odors (e.g. Becker et al., *Medical and Veterinary Entomology,* 9:377–380, 1995). Poultry protein was also proposed as a fly attractant together with microorganisms capable of digesting the protein (Andersen et al., U.S. Pat. No. 4,849,216). Another type of insect attractant proposed for use in traps comprising various other components is yeast together with a carbohydrate source which it is capable of fermenting (see for example, Bouillard, J., et al., in French Patent Publication FR 2705200). Dieguez, J. M., et al., in U.S. Pat. No. 5,382,422, describe a method for providing a flow of carbon dioxide gas containing a vapor of a liquid insect attractant selected from acetone and octanol. A trap for hematophagous insects utilizing a methanol fuel cell to provide carbon dioxide, water vapor and heat, as attractive agents, was proposed by Miller, M. H., in U.S. Pat. No. 5,669,176. Moreover, carbon dioxide for use as an insect attractant, was chemically generated in U.S. Pat. No. 4,506,473 (Waters, Jr., J. et al.).

The entire contents of the above-mentioned patents, patent applications and literature articles are incorporated by reference herein.

SUMMARY OF THE INVENTION

The present invention is based on the discovery that in a trapping device for insects which feed on mammalian blood, and which comprises a chemical attractant for the insects, significantly improved results are obtained by including in the device a physical attractant consisting of a heated dark panel, together with a trapping arrangement effective in trapping mosquitoes attracted to said panel.

More particularly, the invention provides a trapping device as aforesaid, comprising a combination of the dark panel; a source of said carbon dioxide for emitting the same in the vicinity of the panel, a heating source effective to heat the panel, and the trapping arrangement.

In a particular embodiment, the chemical attractant includes carbon dioxide. It is particularly preferred that at least one of the following features applies:

(a) the insects are mosquitoes;

(b) the trapping arrangement comprises an adhesive, preferably applied onto said panel;

(c) the panel is heated to a temperature of within the range of about 30 to 45° C.;

(d) the source of carbon dioxide (when used) is a fermentation process involving the action of microorganisms, preferably comprising yeast, on a fermentable substrate in aqueous medium.

In another embodiment, the chemical attractant comprises at least one member selected from fermenting yeast, yeast extract, peptone, acetone, lactic acid and carbon dioxide.

Also provided by the invention is a method for trapping insects which feed on mammalian blood, which comprises use of a chemical attractant for the insects and which comprises use additionally of a physical attractant consisting of a heated dark panel, together with a trapping arrangement effective in trapping mosquitoes attracted to said panel.

The heating source typically heats the panel to a temperature within the range of 30–55° C., e.g. about 30–45° C., preferably within the range of about 33–41° C., typically to a temperature of about 35–39° C. In a particular embodiment, the panel is heated to a temperature of about 37° C. In another preferred embodiment, the panel is heated to a temperature of about 40–44° C.

As indicated above, the $CO_2$ source, in accordance with an embodiment of the invention, is constituted by microorganisms (e.g. yeast) which are capable during fermentation, to emit carbon dioxide. Where yeast is used, this may be provided in a capsule, in dispersed form, as a hard-pressed tablet, etc. In order to effect fermentation, the microorganisms, e.g. the yeast, are brought into intimate contact with a fermentable substrate, such as sugar in aqueous medium. The microorganism may, for example, be included in a small vessel having an exhaust outlet at the vicinity of said panel.

BRIEF DESCRIPTION OF THE DRAWINGS

In the description following, some non-limiting embodiments of the invention will be described with reference to the accompanying drawings, in which.

DETAILED DESCRIPTION OF THE INVENTION

Figure 1:
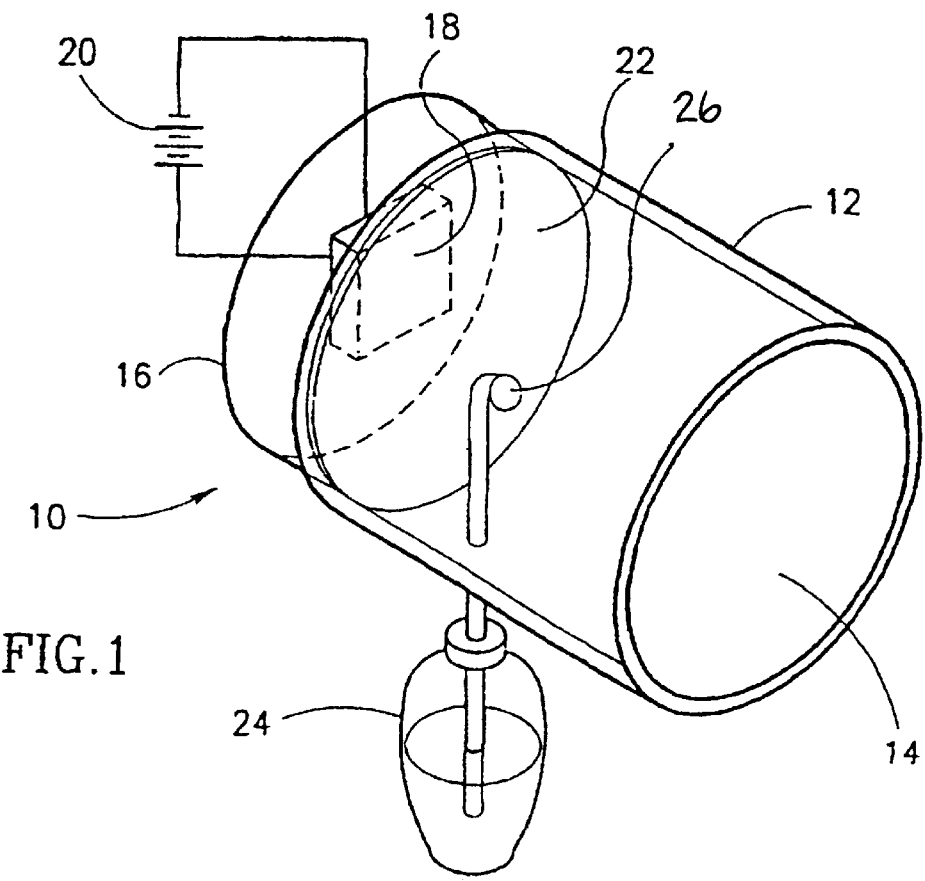
FIG. 1 is a schematic side view of a trapping device of an embodiment of the invention.

Reference is first being made to FIG. 1 showing a device in accordance with an embodiment of the invention generally designated 10 comprising a tube 12 with an opening 14 having a heating unit 16 at the other end of the tube, with a heating element 18 connected to a power source 20. Attached to the rear wall of the tube, overlaying the heating unit, is a black panel 22, which is covered by an adhesive. The device further comprises a fermentation vessel 24 having an exhaust outlet 26 in the vicinity of said panel.

In use, yeast is added into vessel 24 and mixed with an nutritional substance, e.g. sucrose, giving rise to fermentation which emits $CO_2$ through exhaust outlet 26. As will be appreciated, in order to ensure a continuous $CO_2$ emission, the yeast may be incorporated in a sustained release formulation, known per se.

The invention will now be further illustrated by the following non-limiting Examples.

EXAMPLES

Preliminary note: In the Examples, the yeast was baker's yeast, "Safe Instant" brand, manufactured in France, the yeast extract was batch no. 0127 and the peptone was "peptone bacto" no. 0118, all supplied by C.I.E.T.—CARMEL, Israel. In each Example, there were no mosquitoes remaining when the room (or cage) was examined the day after introducing them, i.e. there was 100% kill. Where applicable, a new batch of mosquitoes was introduced each day.

Example 1

Mosquito traps were prepared in accordance with an embodiment of the invention. Each trap included a chemical attractant comprised of a mixture of 25–30 g yeast, 135 g sucrose and 1000 cc water. The traps included also a heating unit which heated the sticker to a temperature of about 37° C. In some of the traps the sticker was a black sticker while in the other group of traps the sticker was a bright color one.

In three individual tests, two traps one having a black sticker and the other having a light color sticker were placed in a room in the presence of one adult individual. The mosquitoes were released in the room and a number of mosquitoes caught in each trap were counted two hours after their release.

As seen in Table 1 below, a large number of mosquitoes were trapped in the trap having the black sticker while no mosquitoes or only very few were trapped in the trap having a light color sticker.

TABLE 1

| | Number of mosquitoes caught by trap | |
|---|---|---|
| Experiment No. | Black Sticker | Light color sticker |
| 1. In room | 6 | — |
| 2. In room | 3 | 0 |
| 3. In room | 17 | 3 |
| Total | 26 | 3 |

Example 2

Traps were prepared as described in Example 1 above, and placed in cages. Mosquitoes were released in the cage and the number of mosquitoes caught in cages having traps with black stickers were compared to the number of mosquitoes caught in cages having traps with light color stickers two hours after release of the mosquitoes.

As seen in Table 2 below, and in agreement with the results of Experiment 1 above, most of the mosquitoes were caught in traps having a black sticker as compared to none or a single mosquito trapped in the trap having a light color sticker.

TABLE 2

| | Number of mosquitoes caught by trap | |
|---|---|---|
| Experiment No. | Black Sticker | Light color sticker |
| 1. In cage | 5 | 1 |
| 2. In cage | 10 | 0 |
| 3. In cage | 5 | 0 |
| Total | 20 | 1 |

Example 3

Traps were prepared as in Example 1 above. A trap having a black and a trap having a light colored sticker were placed either in a laboratory room in the presence of one adult individual or in a cage. Mosquitoes were released and a number of mosquitoes caught in each trap were counted 24 hours after their release.

Figure 2:
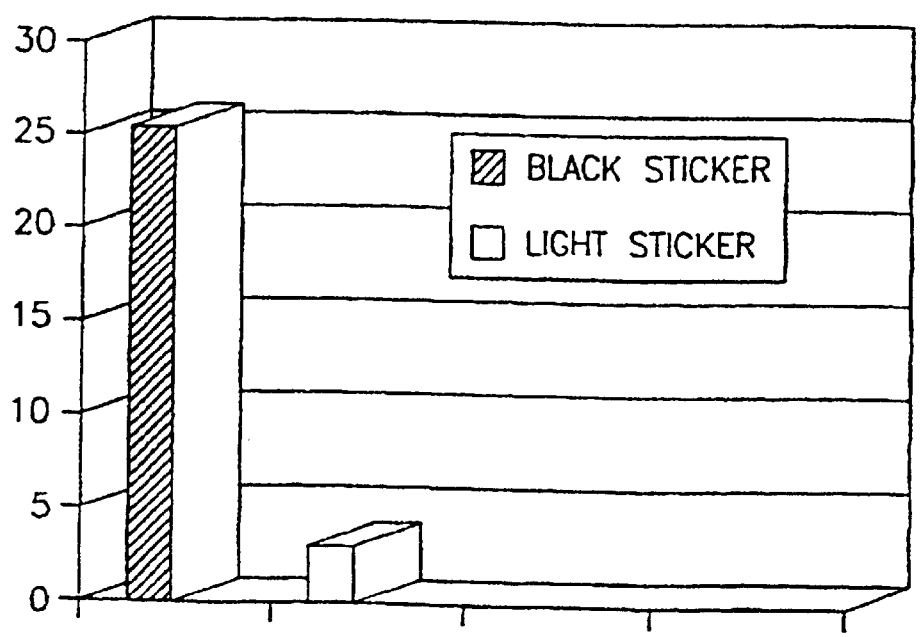
FIG. 2 shows a comparison of the number of mosquitoes trapped in the device having a dark (black-colored) sticker as compared to a device with a light colored sticker. Mosquitoes were released in a room and the number of mosquitoes trapped after 24 hours was then counted.
Figure 3:
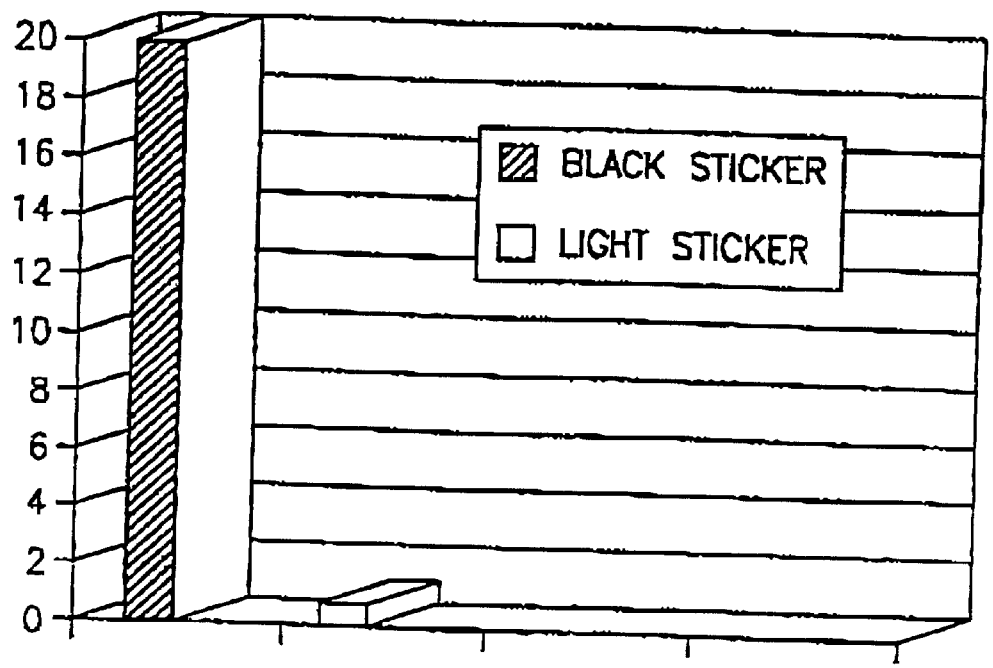
FIG. 3 shows results of a similar experiment as in FIG. 2, performed in a cage.

As seen in FIGS. 2 (room) and 3 (cage) most of the mosquitoes both in the laboratory room as well as in the cage were caught in the trap having a black colored sticker while only a very low number of mosquitoes were caught in the trap having a light colored sticker. This was true whether the light colored sticker was, e.g., pink, yellow, white or pale-blue.

Example 4

Traps comprising the above chemical attractant (25–30 g yeast+135 g sucrose+1000 cc water) were prepared all with black stickers. The traps were divided into two groups, one in which the sticker was placed above a heater heating the sticker to a temperature of about 37° C. and the other group of traps in which the sticker was not heated.

Figure 4:
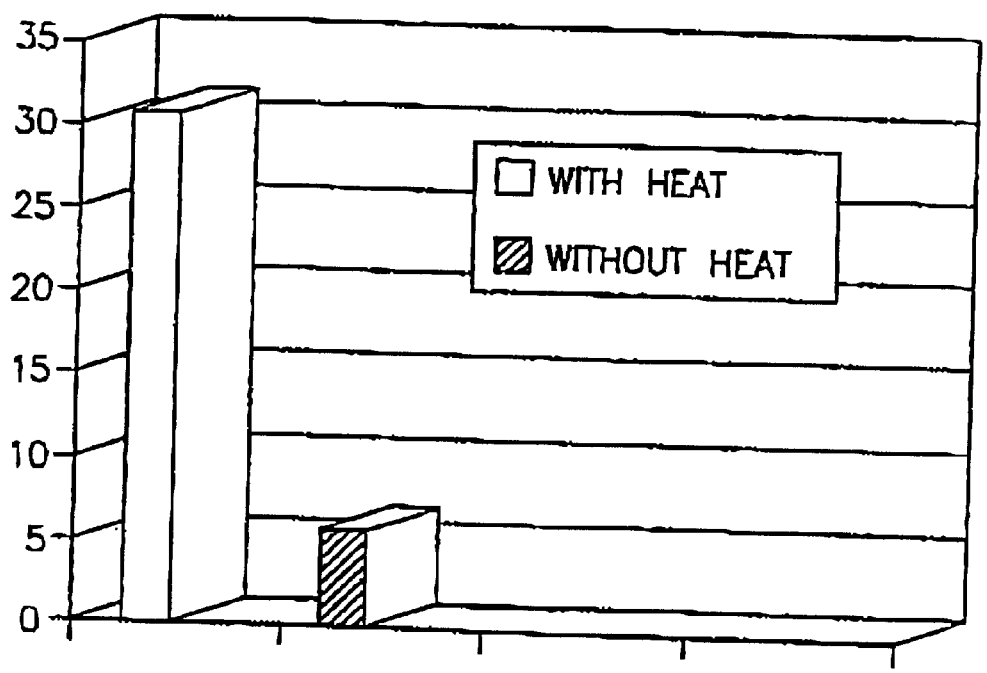
FIGS. 4 and 5 show results of two experiments comparing the trapping with heating and without. The experiment was performed similarly as in FIG. 2.
Figure 5:
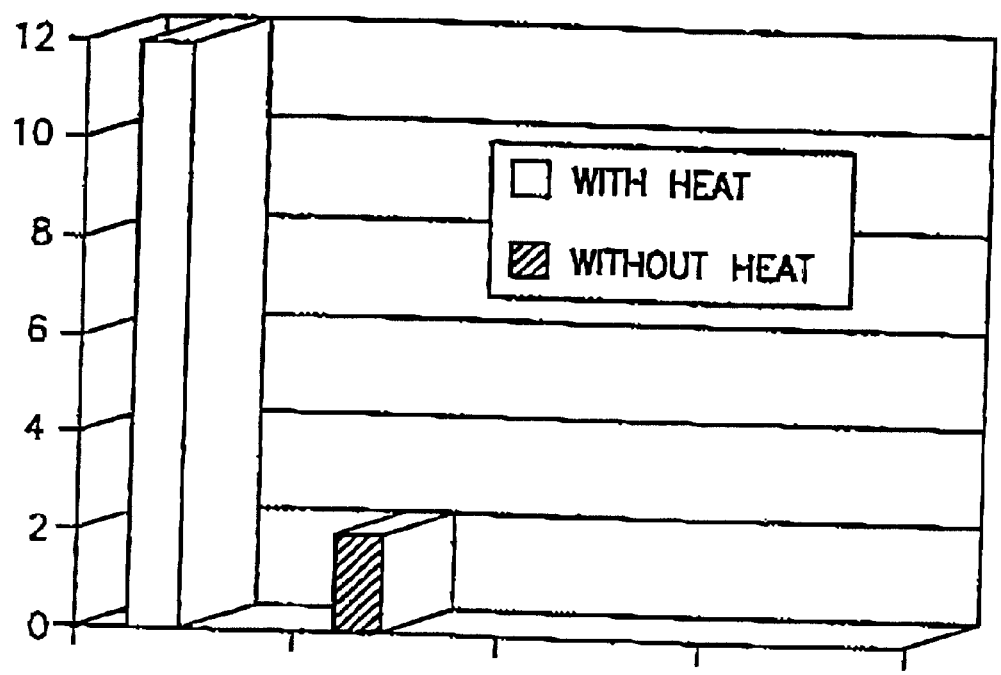
Figure 6:
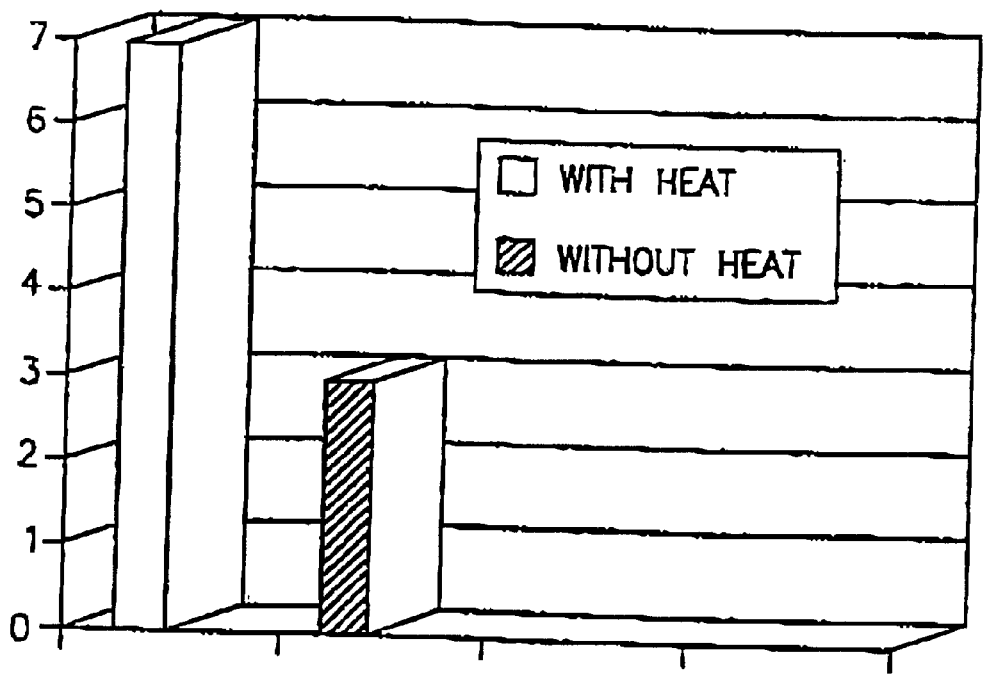
FIG. 6 shows results of an experiment, similarly to FIGS. 4 and 5, performed in a cage.

The traps were placed either in a room in the presence of one adult or in a cage. The mosquitoes were released and the number of mosquitoes caught in each trap were monitored 24 hours after their release. As seen in Table 3 below and in FIGS. 4–6, the number of mosquitoes caught in traps in which the black sticker was heated both in the room (FIGS. 4 and 5) as well as in the cage (FIG. 6) were significantly higher than the number of mosquitoes caught in the traps in which the black stickers were not heated.

TABLE 3

| | Number of mosquitoes caught by trap | |
|---|---|---|
| Experiment No. | Trap with addition of heat | Trap without heat |
| 1. In room | 31 | 6 |
| 2. In room | 12 | 2 |
| 3. In room | 7 | 3 |
| Total | 50 | 11 |

Example 5

Mosquito traps were prepared in accordance with an embodiment of the invention. Each trap included a chemical attractant comprised of a mixture of 10 g yeast, 3 g yeast extract, 6 g peptone, 90 g sucrose and 1000 cc water. The dark panel was heated to a temperature of about 41° C. The total no. of mosquitoes trapped was after one day 14 and after two days 26. No further mosquitoes were trapped on day 3.

Example 6

The procedure of Example 5 was repeated, using as chemical attractant a mixture of 15 g yeast, 3 g yeast extract, 6 g peptone, 120 g sucrose and 1000 cc water. The dark panel was heated to a temperature of about 41° C. The total no. of mosquitoes trapped was after one day 14, after two days 26, and after three days 30.

The above results demonstrate the synergistic activity of the combination of the invention comprising a chemical and a physical attractant—the latter consisting of a heated dark panel. Traps comprising the above combination were very potent in trapping mosquitoes both in short term experiments as well as in long term ones. The high efficiency of the traps of the invention was also demonstrated when the traps were placed in a large room in the presence of a single human individual. The presence of the individual (which typically attracts mosquitoes) did not adversely effect the efficiency of the device and method of the invention.

Example 7

Samples of the contents of the traps in experiments similar to Examples 5 and 6 were analyzed, with the following results:

TABLE 4

| No. (time*) | elapsed time in days● | Initial Analysis on each sample♦ | | |
|---|---|---|---|---|
| | | Acetone ppm | Lactic acid mg/l | Carbon dioxide % |
| 1 (17.03) | 3 | 2.54 | 424.38 | 0.09 |
| 2 (17.57) | 3 | 1.94 | 173.61 | 0.09 |
| 3 (18.30) | 2 | 1.66 | 369.47 | 0.11 |
| 4 (18.46) | 2 | 1.62 | 436.24 | 0.98 |
| 5 (18.58) | 1 | 1.20 | 442.18 | 2.55 |
| 6 (19.11) | 1 | 1.12 | 798.30 | 4.24 |

*of initial analysis
●from commencement of fermentation
♦samples 1, 3 and 5 were from a fermentation mixture of 10 g yeast, 4 g yeast extract, 7 g peptone, 140 g sucrose and 1000 cc water; samples 2, 4 and 6 were from a fermentation mixture of 10 g yeast, 3 g yeast extract, 6 g peptone, 95 g sucrose and 1000 cc water.

Table 4 confirms the presence after a time lapse of 1, 2 or 3 days, of acetone, lactic acid and carbon dioxide, in the chemical attractant constituted by fermentation mixtures in accordance with embodiments of the invention.

While particular embodiments of the invention have been particularly described above, it will be apparent to skilled persons that the present invention is not limited thereto, since many modifications or variations can be made. Such modifications or variations, which have not been detailed herein, are deemed to be obvious equivalents of the present invention.

What is claimed is:

1. In a trapping device for insects which feed on mammalian blood, and which comprises a source of chemical attractant for the insects, the improvement comprises including in the device a physical attractant comprising a dark panel consisting of a single flat panel and a heating source effective to heat said panel, together with a trapping arrangement effective in trapping insects attracted to said panel which comprises adhesive on said panel, said chemical attractant being free from octenol and including a source of carbon dioxide produced via a fermentation process involving the action of microorganisms on a fermentable substrate in an aqueous medium.

2. A device according to claim 1, further characterized by at least one of the following features:

(a) said insects are mosquitoes; and, (b) said panel is heated to a temperature of within the range of about 30 to 45° C.

3. A device according to claim 2, wherein said microorganisms comprise yeast, and said substrate comprises sugar.

4. A device according to claim 3, wherein said fermentation process is effected in the presence of peptone.

5. A device according to claim 1, wherein said chemical attractant comprises at least one member selected from the group consisting of fermenting yeast, yeast extract, peptone, acetone, and lactic acid, and at least one of the following features applies:

(a) said insects are mosquitoes; and (b) said panel is heated to a temperature of within the range of about 30 to 45° C.

6. In a method for trapping insects which feed on mammalian blood, and which comprises use of a source of chemical attractant for the insects, the improvement which comprises use additionally of a physical attractant comprising a dark panel consisting of a single flat panel and a heating source effective to heat said panel, together with a trapping arrangement effective in trapping insects attracted to said panel which comprises adhesive on said panel, said chemical attractant being free from octenol and including a source of carbon dioxide produced via a fermentation process involving the action of microorganisms on a fermentable substrate in an aqueous medium.

7. A method according to claim 6, further characterized by at least one of the following features:

(a) said insects are mosquitoes; and, (b) said panel is heated to a temperature of within the range of about 30 to 45° C.

8. A method according to claim 7, wherein said microorganisms comprise yeast, and said substrate comprises sugar.

9. A method according to claim 8, wherein said fermentation process is effected in the presence of peptone.

10. A method according to claim 6, wherein said chemical attractant comprises at least one member selected from the group consisting of fermenting yeast, yeast extract, peptone, acetone, and lactic acid, and at least one of the following features applies:

(a) said insects are mosquitoes; and (b) said panel is heated to a temperature of within the range of about 30 to 45° C.

* * * * *